United States Patent [19]
Orazi

[11] Patent Number: 5,984,230
[45] Date of Patent: Nov. 16, 1999

[54] WING ASSEMBLIES FOR AIRCRAFT

[76] Inventor: Paul Orazi, P.O. Box 610192, Miami, Fla. 33261

[21] Appl. No.: 08/990,600

[22] Filed: Dec. 15, 1997

[51] Int. Cl.[6] .......................................................... B64L 3/00
[52] U.S. Cl. ............................................. 244/39; 244/124
[58] Field of Search ................................ 244/38, 39, 123, 244/130, 46, 124, 10, 19, 21; 416/4, 110

[56] References Cited

U.S. PATENT DOCUMENTS

| | | | |
|---|---|---|---|
| 1,989,291 | 1/1935 | Prewitt | 244/38 |
| 3,756,541 | 9/1973 | Orazi | 244/39 |
| 4,471,925 | 9/1984 | Kunz | 244/130 |
| 4,577,815 | 3/1986 | Orazi | 244/39 |

FOREIGN PATENT DOCUMENTS 740800  2/1933  France ...................................... 244/38

*Primary Examiner*—Galen L. Barefoot

[57] ABSTRACT

A rotary wing having a spar that flexes and crosses the axis of the spar in two or more points. The spar mounts two adjacent flying surfaces extending spanwise and rotatable about the longitudinal axis of the spar without the transmission of flexural movement to the wing sheets. The adjacent edges of the flying surfaces are adapted such that the flying surfaces are capable of engaging each other and thus they cooperate to constitute a wing.

17 Claims, 4 Drawing Sheets

WING ASSEMBLIES FOR AIRCRAFT

BACKGROUND OF THE INVENTION

The present invention relates to a modification of the invention claimed in U.S. Pat. No. 4,577,815 which describes a rotary wing assembly whereby during rotation of the wing, the wing spar can flex within the wing sheets without transmission of corresponding flexural movement to the wing sheets. In a modified wing the spar and a plurality of bearings provide the framework, and the wing sheets forming a flying surface are able to slide on such a frame: the assembly has no structure between the wing sheets and the bearings, and no contacting structure surrounding the circumference of the bearings.

The wing sheets do not float on the spar, but on the outer rings (outer races) of said bearings, and they are rotatable about said spar through said bearings.

In both mentioned cases, the spar curvature during flexion crosses the span axis of the flying surface in two points of the spar span.

SUMMARY OF THE INVENTION

In the present invention the spar curvature during flexion crosses the said span axis in more than two points. According to the present invention, the spar mounts two adjacent flying surfaces extending spanwise and rotatable about the longitudinal axis of said spar, whereby during rotation of the wing, the spar can also flex without transmission of flexural movement to the wing sheets.

Each flying surface has the assembly to achieve the relative movement between the wing sheets and the spar autonomous, thus the relative movement between one flying surface and the spar is independent from the relative movement between the other flying surface and the said spar, and the flying surfaces undergo a limited movement relative to each other during the whole phase of rotation of 360° as they are separated by a chordwise clearance. The adjacent edges of the flying surfaces are adapted such that the flying surfaces are capable of engaging each other and thus they cooperate to constitute a wing.

BRIEF DESCRIPTION OF THE INVENTION

The invention is illustrated, by way of example, in the accompanying drawings in which.

DETAILED DESCRIPTION OF THE INVENTION

Figure 1:
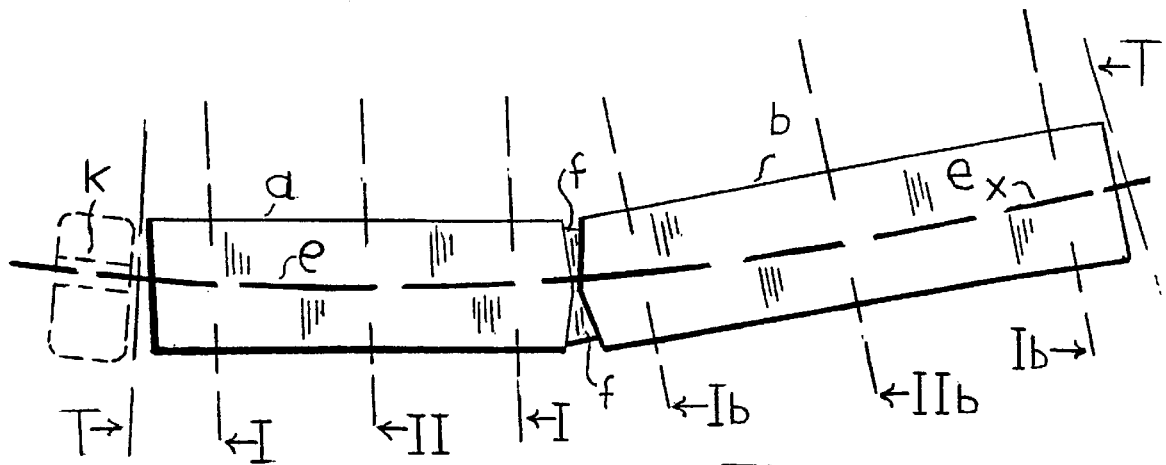
FIG. 1 is a side elevation of an embodiment of a wing, shown in rotary motion about its span axis.

Referring to the drawings an aircraft fuselage carries a rotatable tubular bular spar e transversely mounted in bearings K (as snown in my U.S. Pat. Nos. 3,477,663, 3,540,681, 3,756,541, and 4,778,151), which spar e undergoes longitudinal flexion as shown in FIGS. 1, 3, 7, 8 when in rotary motion. The spar e carries transverse ribs (not shown) disposed in one plane and extending symmetrically through the spar (as shown in my U.S. Pat. Nos. 3,540,681 and 4,577,815.

In FIG. 1 there is shown a wing comprising a spar e, the said spar carrying two flying surfaces made of two longitudinnally extending wing sheets a, b, each in the form of a pair of sheets linked togetner at their edges to form a box-like structure (not shown), as shown in my U.S. Pat. No. 4,577,815, are loosely carried by the said spar e and the said ribs disposed in one plane, in order to maintain the chordal planes of each wing panel parallel to each other during the spar flexion during the whole phase of rotation, while the movement of the wing sheet a relatively to the frame is independent from the movement of the wing sheet b relatively to the frame. Two links (not shown), as in my U.S. Pat. No. 4,577,815, are provided on each wing panel a, b, at a spanwise distance between them, to link each wing panel a, b, to the spar e. They are positioned at points of the span of each wing panel a, b, (which produce a relative movement between each flying surface and the frame, suitable for the rotation), where the lines I and $I_b$ intercept the spar e. (On each flying surface, as the spar reverses its curvature every 180° of rotation, two opposite curves are covered by the said spar in the chordal planes of the said flying surfaces which curves intercept at the two points corresponding to the position of the said two links). As in my U.S. Pat. No. 4,577,315, at least one of the two links of each wing panel must be capable of spanwise travel relatively to the spar towards port and conversely towards starboard every 90° of the phase of rotation.

Figure 7:
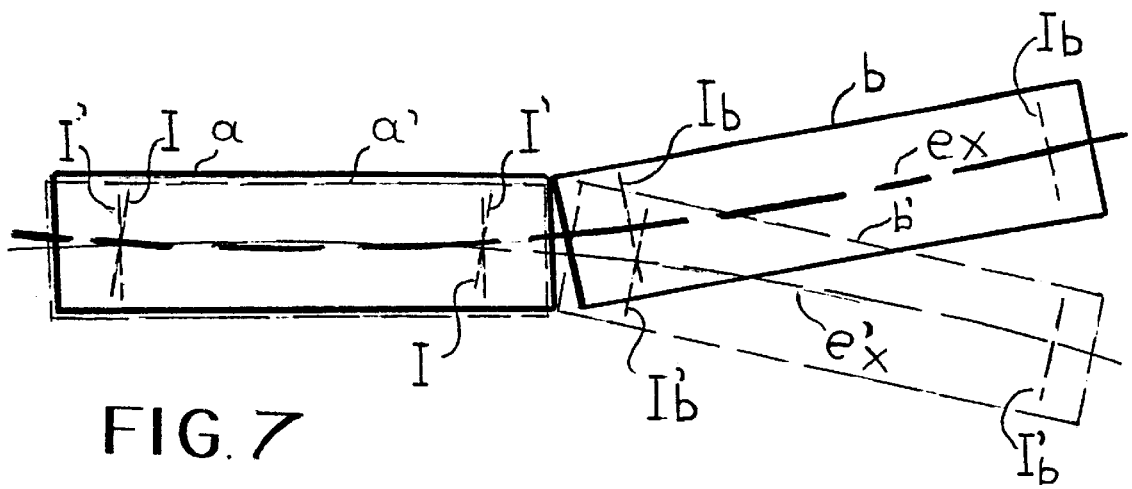
FIG. 7 is a detail of FIG. 1.

In the case of the wing sheets rotatable about the spar, each flying surface has two bearings (not shown), as in my U.S. Pat. No. 4,577,815, linking the wing panel to the spar e at the same points where the lines I, $I_b$ intercept the spar e, as seen in FIGS. 1 and 7. Because both bearings linking each wing panel to the spar are able to move spanwise on the spar (as to allow the spar flexion), each wing panel is able to move spanwise relatively to the-spar, thrust bearings (not shown) are mounted at the root and tip of the spar e where the lines T intercept the spar (FIG. 1), to stop the spanwise travel of the panels a, b, (as in my previous Patent). Also, as can be seen in FIG. 1, the spar e mounts one bearing for each wing panel at the point where the lines II and $II_b$ intercept the spar e, wherein the wing panel has no contacting structure surrounding the circumference of the said bearings (not shown), as in my previous Patent.

Figure 2:
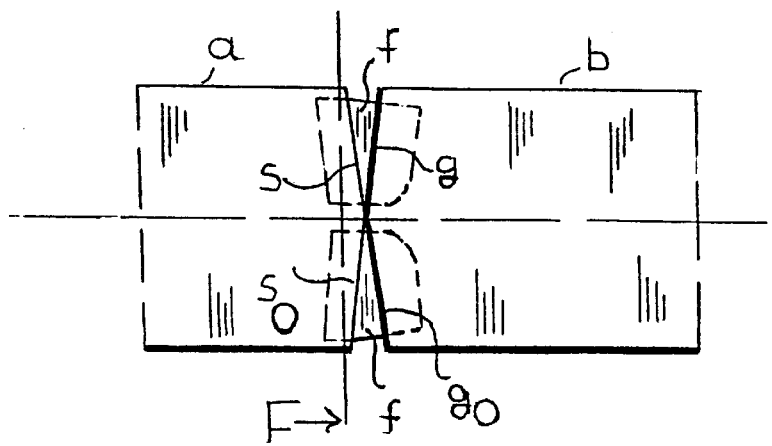
FIG. 2 is a plan view of the wing shown in FIG. 1.
Figure 3:
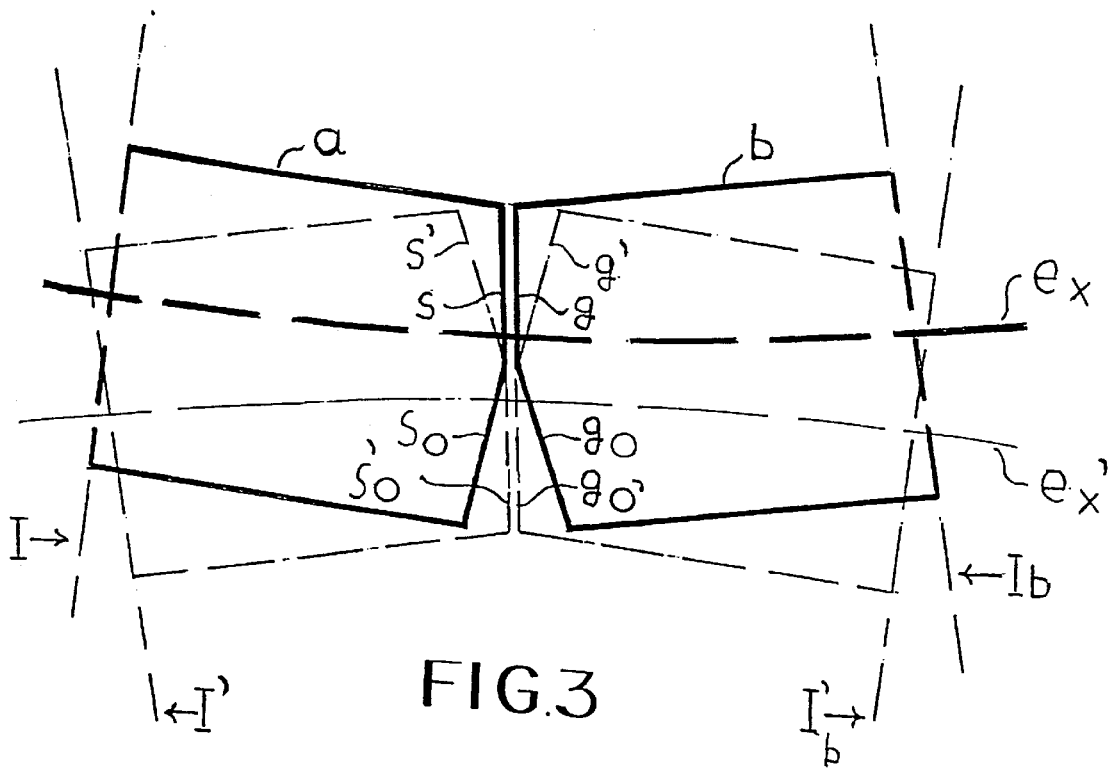
FIG. 3 is a detail of FIG. 1.
Figure 6:
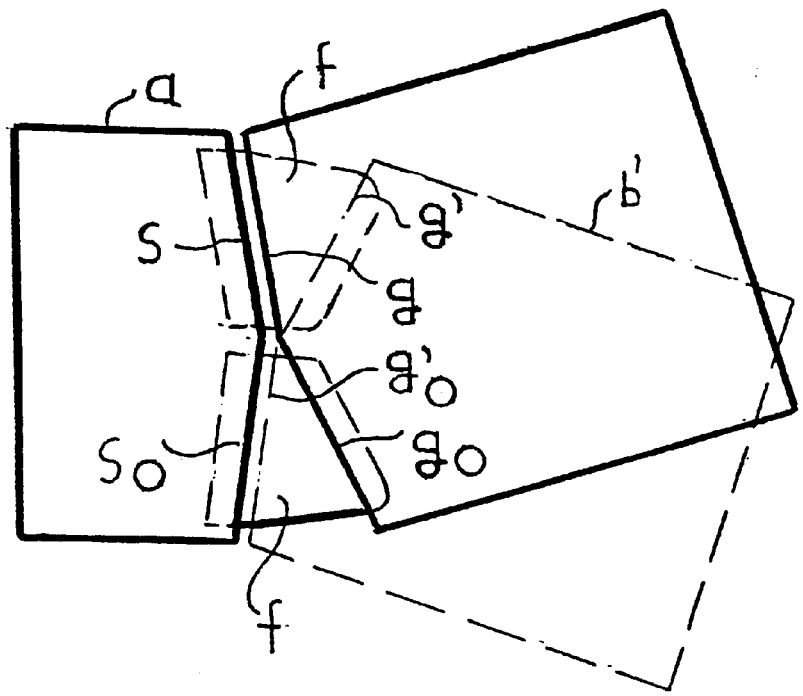
FIG. 6 is a detail of the wing of FIG. 2.

FIGS. 3, 6 show the wing panels a, b, in a common chordal plane. As the clearance between the said flying surfaces varies during rotation, the wing sheets a, b, have their adjacent chordal edges s, g, and $s_o$, $g_o$ tapered in such a fashion that the said flying surfaces are capable of angling movement relatively to themselves while forming a minimum clearance between each other when the angle formed by the longitudinal edges a, b, has reached its maximum degree (due to the curvature $e_x$ of the spar), while the spar has reached its maximum flexion during rotation. The slant of the said chordal edges is symmetrical as in FIGS. 2, 4, (which also snow the wing panels a, b, in a common chordal plane, and the axis $e_x$ of the spar straight, and no angle between the longitudinal edges a, b,. (for clarity the same letters a, b, indicating the wing sheets are used).

FIGS. 3, 7 show the movement of the flying surfaces a, b, relatively to each other (for clarity in FIG. 7 the tapering of the chordal edges is not shown). Their longitudinal edges a, b, rotate from positions a, b, to positions a', b' in 180° of rotation, starting when the wing sheets are in a common chordal plane, till they lie again in the said plane. (During rotation the spar flexes to the same Curvature in all the successive angular directions of its cross-section, therefore in one revolution it maintains the curvature $e_x$, thus in operation the spar position is relatively fixed in space, as in FIG. 1). This causes the longitudinal edges of the wing sheets a, b to angle from position a, b to positions a', b' as in FIGS. 3, 7 in 180° of rotation. (In the case of the wing sheets rotatable about the spar, the spar does not rotate, but it flexes to the same curvature $e_x$, thus in this case too the spar position is generally fixed in space.)

In FIG. 3 there is shown the travel of the adjacent chordal edges relatively to themselves. It can be seen that the correspondent chordal edges s, g are close, and after 180° of the phase of rotation they are distanced in positions s', g', while the opposite chordal edges traveled from positions $s_o$, $g_o$ to positions $s_o'$, $g_o'$.

In operation, while the airfoil is vertical and the two wing panels a, b lie in a common chordal plane, as in FIG. 1, the correspondent adjacent chordal edges s, g on top are close, while the adjacent edges $s_o$, $g_o$ at the bottom are distanced, as in FIGS. 3, b, to accomodate the said spar curvature $e_x$.

(The curvatures $e_x'$ of FIGS. 3, 7 are shown only for drawing purposes, as the said FIGS. show the total travel of the chordal and longitudinal edges relatively to themselves, as performed while the said flying surfaces lie in a common chordal plane, and the spar flexes from the curvature $e_x$ to the curvature $e_x'$. But in operation, the said travel is not performed while the wing panels lie in the said plane, but it is performed in ½ revolution while the spar curvature $e_x$ is generally fixed in space, as in FIG. 1. The degree of this travel during rotation is equivalent to the degree of the travel as shown in FIGS. 3, 7. So in operation, only the spar curvature $e_x$, as generally fixed in space, is to be considered.)

The flying surfaces span axis (not shown) with reference to each other form two angles: one in directions parallel to the chordal plane of the wing assembly, and the other in directions perpendicular to the said plane: the said angles vary continuously during the whole phase of rotation of 360°, from a degree of zero to a degree according to the spar curvature $e_x$ while the spar has reached its maximum flexion. As in operation the spar curvature is generally fixed in space, during rotation of the assembly the said two angles vary inversely such that while one increases, the other decreases, thus while one is zero, the other has reached its maximum degree. Namely, when the die-hard formed by the two flying surfaces has reached its maximum degree in directions perpendicular to the chordal plane, as in FIG. 8 (in this FIG. the opposite die-hard is not shown), the angle formed by the longitudinal edges of the two flying surfaces in directions in the chordal plane, is zero. In the next 90° of rotation this angle reaches its maximum degree while the flying surfaces are in a common chordal plane as in FIG. 7, and the angle in directions perpendicular to the said plane which was a die-hard is now zero. (The maximum degree reached by the two said angles is the same.) In the next 45° of rotation the two flying surfaces form two angles at the same time: the die-hard and the angle in directions parallel to the chordal plane: the degree of these said angles being small in this case.

The resultant is an angle in directions other than in the mentioned directions. The said angles ten are formed in all the successive angular directions of the flying surfaces transverse-section, while the chordal axis of the two wing sheets are maintained parallel.

Because the spar curvature of flexion decreases from root to tip, there is some difference in the degree of the relative movement between the frame and one flying surface, and the degree of the relative movement between the frame and the other flying surface.

In FIGS. 1, 3, 7 it can be seen that the spar curvature $e_x$ does not pass through the center of the wing chord where the points of the symmetrically tapered edges meet, but passes at the center of the wing chord at lines I and $I_b$ where the mentioned links are positioned. This is because the position of the two links at the extremities of said wing panels is not suitable for the movement of the wing sheets relatively to the frame during rotation.

Figure 4:
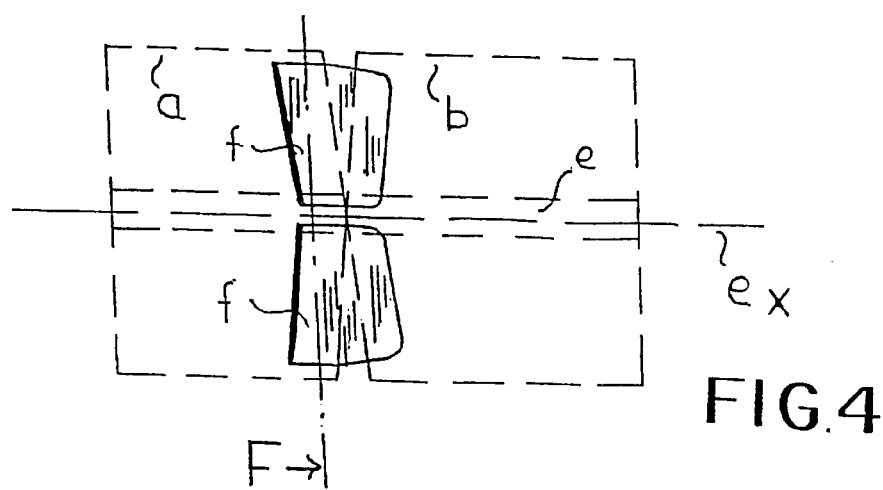
FIG. 4 is a detail of FIG. 2.
Figure 8:
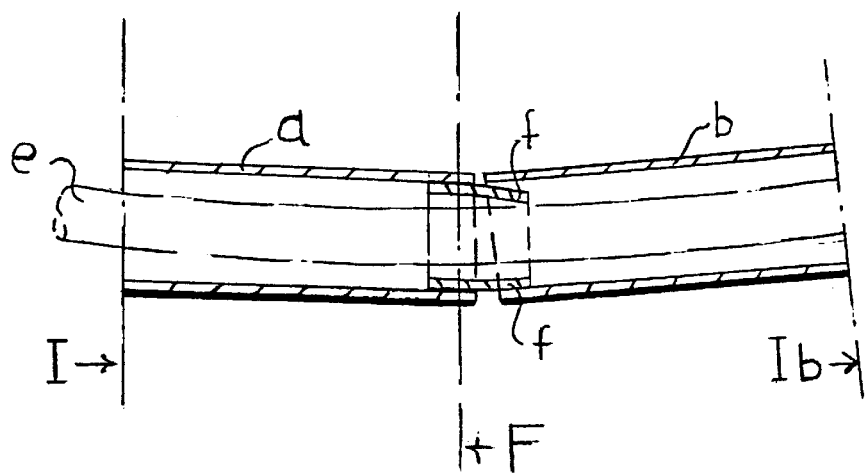
FIG. 8 is a view in profile of the wing shown in FIG. 1.

As can be seen in FIGS. 2, 4, 5, 8, two sets of flanges f made of sheet and formed in such a fashion that the said flanges have an airfoil repeating the common airfoil shape of the wing panels a, b, are riveted (not shown) to the chordal edge of the panel a, in correspondence of line F of FIGS. 2, 4, 8. As can be seen from FIG. 5, the flanges f are mounted oppositely inside the wing sheets a and riveted to it, and they have a portion extending within the wing sheet b, but they are not riveted to it as in FIGS. 2, 4. Since the airfoil cross-section size of the box-like wing panel b is one same as that of one wing panel a, the mentioned portion of the flanges f extending inside the wing panel b is able to float on it in an overlapping relationship, thus allowing the movement of one flying surface relatively to the spar, independent from the movement of the other flying surface relatively to the said spar, and thus allowing the relative movement between the two flying surfaces.

FIG. 6 shows the movement of the panel b relatively to the panel a when the adjacent chordal edges s, g are close, and also when they are separated as $s_o$, $g_o$: the flanges f in both cases cover the above mentioned clearance-in the surface of the wing between the two panels while the airfoil is in vertical position as in FIG. 1, and while the airfoil is in horizontal position as in FIGS. 2, 4, 8, thus achieving a continuity both in the surface and in the airfoil shape of the two wing panels.

In FIG. 8 it can be seen the die-hard formed by the panels a, b while the common airfoil is horizontal, and in this case too the flanges f cover the clearance between the two panels. In further 90° of rotation the said die-hard dwindles to zero, and the panels a, b angle to their maximum degree in the common chordal plane, as shown in FIGS. 1, 3, 6, 7. During all the mentioned positions, the flanges f provide the said continuity in the common wing constituted by the two panels a, b. In the case when the two panels a, b are rotatable about the spar e, the flanges f keep the chordal axis of the said two panels parallel during the whole phase of rotation, because the above mentioned thrust bearings (not shown) mounted at lines T on the spar e, as in FIG. 1, by stopping the spanwise movement of the two panels a, b relatively to the spar, secure the engagement of the two mentioned panels through the said flanges f during the whole phase of rotation, thus preventing the said two panels from separating.

In case where the root panel a is rotated by engine power (not shown) the flanges f cooperate with the wing sheets a, b such that axial rotation of said wing sheet a is transmitted to the wing sheet b only by the said flanges f. When the wing sheets rotate together with the spar, the function of transmitting the said axial rotation and of maintaining the chordal axis of each panel parallel, is performed by the said ribs, and not only by the said flanges.

Figure 5:
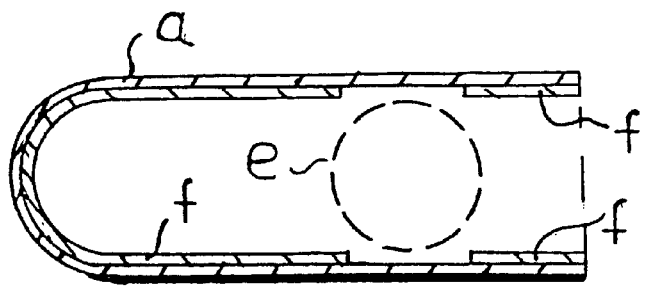
FIG. 5 is a sectional elevation of the wing of WIG. 2 along the line F of FIG. 2.

In FIGS. 2, 4, 5 it can be seen that the flanges;f riveted (not shown) to the chordal edge of the root panel a, do not cover the whole perimeter of the airfoil, but two opposite sets of flanges f are of a size not to cover the central part of the wing sheet forming the panel a, such to leave a clearance between the wing sheet a and the spar e, because during axial rotation while the said inverted die-hards formed, the flanges could rub the spar.

The link means to link the spar to the wing sheets are positioned at points of the span of each flying surface which produce a relative movement between the frame and the wing sheets such that the said relative movement must be suitable not only for the angular rotation, but also for the relative movement of the two flying surfaces relatively to each other, as the degree of this last movement is determined by the said positions, and must also be suitable for the rotation.

What I claim is:

1. A rotary wing assembly for an aircraft, said assembly comprising a spar intended to be mounted upon an aircraft fuselage, and wing sheets forming at least two adjacent longitudinally extending flying surfaces and floating upon a frame including said spar, whereby during rotation of the wing assembly the said spar can flex without transmission of corresponding flexural movement to the wing sheets, wherein the wing sheets undergo limited movement relative to themselves, wherein the degree of limited movement of one flying surface relative to the spar is not equal to the degree of limited movement of the other flying surface relatively to the said spar, the wing sheets comprising sheet means to achieve a continuity in the surface of the said flying surfaces while allowing the said limited movements.

2. An assembly according to claim 1,
wherein the said flying surfaces can move at angles relatively to themselves in all the successive angular directions of the said flying surfaces transverse-section while maintaining their chordal axis parallel.

3. A rotary wing assembly for an aircraft, said assembly comprising a spar intended to be mounted upon an aircraft fuselage, and wing sheets forming at least two adjacent flying surfaces including adjacent chordal edges and floating upon a frame including said spar, the assembly adapted for rotation about the span axis of the wing sheets, whereby during rotation of the wing assembly the said spar can flex without transmission of corresponding flexural movement to the wing sheets, the assembly of each flying surface on the frame to achieve the flexing of the spar being autonomous, wherein the relative movement between the frame and the wing sheets of one flying surface is independent from the relative movement between the frame and the wing sheets of the other flying surface, wherein the said flying surfaces can undergo continuous relative movement between each other, the adjacent chordal edge of one flying surface comprising sheet means extending inside the adjacent chordal edge of the other flying surface while allowing the said relative movements between the said flying surfaces.

4. An assembly according to claim 3, wherein the said adjacent chordal edges sections differ in size from the said sheet means section generally only by the sheet thickness of the said chordal edges.

5. An assembly according to claim 3, wherein the said adjacent chordal edges and the said sheet means form airfoil sections.

6. An assembly according to claim 3, the said flying surfaces comprising wing sheet means overlapping both said adjacent chordal edges and fixed to one of said edges.

7. An assembly according to claim 3, wherein the said flying surfaces can move at angles with reference to each other in directions in the common chordal plane and in directions perpendicular to the said plane and in directions other than in the said directions, while the spar curvature of flexion is maintained generally fixed in space.

8. An assembly according to claim 3,
one of the said flying surfaces comprising a box-like portion capable of engaging the other flying surface in an overlapping relationship and floating on the said adjacent flying surface.

9. An assembly according to claim 3, the flying surfaces including chordal axis, whereby frame means and sheet means cooperate with the said wing sheets to maintain the said axis parallel.

10. An assembly according to claim 3,
wherein each of the said flying surfaces comprises link means to link the spar to the wing sheets, whereby said link means are positioned at points of the span of the said flying surfaces which produce a relative movement between the wing sheets of one flying surface and the wing sheets of the other flying surface such that the said relative movement is suitable for the said rotation.

11. An assembly according to claim 3, wherein a plurality of bearings coaxial with the spar and the said spar constitute the frame.

12. A rotary wing assembly for an aircraft, said assembly comprising a spar intended to be mounted upon an aircraft fuselage, and wing sheets forming at least two adjacent flying surfaces and floating upon a frame including said spar, whereby during rotation of the wing assembly the said spar can flex without transmission of corresponding flexural movement to the wing sheets, the flying surfaces comprising sheet means such that the said flying surfaces are capable of maintaining each other engaged, the assembly of each flying surface on the frame to achieve the flexing of the spar being autonomous, wherein the relative movement between the frame and the wing sheets-of one flying surface is independent from the relative movement between the frame and the wing sheets of the other flying surface, wherein the said flying surfaces can undergo continuous relative movement between each other, the said flying surfaces including adjacent chordal edges, the said edges maintaining a variable chordal clearance between them to accomodate the angling movement of the said flying surfaces relatively to each other, which chordal edges have a slant such that during their limited movement towards or away from each other the said flying surfaces are close such that the said chordal clearance is minimal while the spar has reached its maximum flexion.

13. A rotary wing assembly for an aircraft, the said assembly comprising a spar intended to be mounted upon an aircraft fuselage, and wing sheets forming at least two adjacent flying surfaces and floating upon a frame including said spar and including a chordal clearance between them, whereby during rotation of the wing assembly the said spar can flex without transmission of corresponding flexural movement to the wing sheets, the flying surfaces varying the said clearance while undergoing limited movement relatively to themselves, the flying surfaces comprising sheet means capable of maintaining the said clearance covered, the assembly of each flying surface on the frame to achieve the flexing of the spar being autonomous, wherein the relative movement between the frame and the wing sheets of one flying surface is independent from the relative movement between the frame and the wing sheets of the other flying surface, wherein the said flying surfaces can undergo continuous relative movement between each other, wherein the said wing sheets include adjacent chordal edges, which edges have a slant in the common chordal plane of the wing assembly such that they cooperate to alternately get close for half of their chordal perimeter while the spar has reached its maximum flexion and the wing sheets lie in the said chordal plane.

14. A rotary wing assembly for an aircraft, said assembly comprising a spar intended to be mounted upon an aircraft fuselage, and wing sheets forming at least two adjacent flying surfaces and sliding upon a frame including said spar, the assembly rotatable about its span axis, whereby during rotation of the wing assembly the spar can flex without transmission of corresponding flexural movement to the wing sheets, the wing sheets cooperating with the frame to achieve the flexing of the spar while maintaining a portion of one flying surface floating on the adjacent flying surface, wherein the wing sheets undergo limited movement relative to themselves, wherein the degree of limited movement of one flying surface relative to the spar is not equal to the degree of limited movement of the other flying surface relatively to the said spar, wherein the said flying surfaces include chordal edges, the chordal edge of one of the flying surfaces comprising sheet means, wherein the chordal axis of the two flying surfaces are maintained parallel not by frame means, whereby the two flying surfaces can cooperate to constitute a wing during the whole phase of rotation of 360°.

15. A rotary wing assembly for an aircraft, said assembly comprising a spar intended to be mounted upon an aircraft fuselage, and wing sheets forming at least two adjacent flying surfaces and floating upon a frame including said spar, whereby during rotation of the wing assembly the said spar can flex without transmission of corresponding flexural movement to the wing sheets, the flying surfaces comprising sheet means such that the said flying surfaces are capable of maintaining each other engaged, wherein the wing sheets undergo limited movement relative to themselves, wherein the degree of limited movement of one flying surface relative to the spar is not equal to the degree of limited movement of the other flying surface relatively to the said spar, the said wing sheets including a chordal clearance between them, wherein the shape of the said clearance can alternately form a straight line for half of the chordal dimension of the said wing sheets while the spar has reached its maximum flexion.

16. A rotary wing assembly for an aircraft, the said assembly comprising a spar intended to be mounted upon an aircraft fuselage, and wing sheets forming at least two adjacent flying surfaces and floating upon a frame including said spar and including a chordal clearance between them, whereby during rotation of the wing assembly the said spar can flex without transmission of corresponding flexural movement to the wing sheets, the flying surfaces varying the said clearance while undergoing limited movement relatively to themselves, the flying surfaces comprising sheet means capable of maintaining the said clearance covered, the assembly of each flying surface on the frame to achieve the flexing of the spar being autonomous, wherein the relative movement between the frame and the wing sheets of one flying surface is independent from the relative movement between the frame and the swing sheets of the other flying surface, wherein the said flying surfaces can undergo continuous relative movement between each other, the adjacent chordal edges of the flying surfaces being oppositely symmetrically tapered in the chordal plane of the wing assembly such to form a minimal chordal clearance between the said flying surfaces while allowing the said wing sheets to freely angle in the said common chordal plane to accomodate the spar maximum curvature of flexion.

17. A rotary wing assembly for an aircraft, said assembly comprising a spar intended to be mounted upon an aircraft fuselage, and wing sheets forming flying surfaces and floating upon a frame including said spar, and a chordal clearance between said flying surfaces, whereby during rotation of the wing assembly the said spar can flex without transmission of corresponding flexural movement to the wing sheets, the shape of said wing sheets being such that the said clearance can be minimal in the chordal plane, the assembly of each flying surface on the frame to achieve the flexing of the spar being autonomous, wherein the relative movement between the frame and the wing sheets of one flying surface is independent from the relative movement between the frame and the wing sheets of the other flying surface, wherein the said flying surfaces can undergo continuous relative movement between each other, wherein the adjacent chordal edges of the wing sheets comprise box shaped transverse sections, the wing sheets being separated by a chordal clearance, the said transverse sections forming airfoil sections, the chordal edge of one flying surface comprising an internal sheet flange, the said flange repeating the shape of the said airfoil sections and engaging internally a portion of the adjacent wing sheet in an overlapping relationship and floating on said portion, thereby to accomodate the angling movement of the said wing sheets relatively to each other, the dimension of the said portion being such that the said flange can offset the said chordal clearance while the spar has reached its maximum flexion while generally achieving a continuity both in the surface and in the said airfoil sections of the said flying surfaces.

* * * * *

UNITED STATES PATENT AND TRADEMARK OFFICE
CERTIFICATE OF CORRECTION

PATENT NO. : 5,984,230
DATED : Nov. 16, 1999
INVENTOR(S) : Paul Orazi

It is certified that error appears in the above-identified patent and that said Letters Patent is hereby corrected as shown below:

In column 3, line 46, 49, 55, 58,
in column 4, line 39, 42, and
in column 5, line 3,
" die-hard " should read " dihedral ".

In column 3, line 62 " ten " should read " then ".

Signed and Sealed this

Tenth Day of April, 2001

Attest:

NICHOLAS P. GODICI

Attesting Officer    Acting Director of the United States Patent and Trademark Office